United States Patent Office 3,480,653
Patented Nov. 25, 1969

3,480,653
METAL ORGANIC COMPOUNDS CONTAINING
METAL—O—N LINKAGE
Kailash Chandra Pande, Adrian, Mich., and Richard Eugene Ridenour, Sylvania, Ohio (both % Stauffer Chemical Company, Box 428, Adrian, Mich. 49221)
No Drawing. Filed July 5, 1966, Ser. No. 567,339
Int. Cl. C07f 7/28, 5/06; B01j 11/06
U.S. Cl. 260—429.3   15 Claims

ABSTRACT OF THE DISCLOSURE

This invention relates to a new class of organic compounds, distinguished in that they comprise a metal—O—N linkage.
The compounds of the invention are embraced by the general formula $$X_nM(ONR_2)_y$$

in which X represents halogen or alkoxy, M represents a metal from any of Groups I–IV of the Periodic Table, R represents alkyl, aryl, or alkenyl, most preferably a low molecular weight alkyl group (i.e. 1–4 carbon atoms), $y=1-4$, $n=0$ when the valence of M is 1, 0 or 1 when the valence of M is 2, 0–2 when the valence of M is 3, and 0–3 when the valence of M is 4 and $n+y$ equals the valence of M.

Such compounds have application in a variety of fields. Thus, among them may be found bonding agents, cross-linking agents for use in silicone chemistry, intermediates, adhesion promoters, film forming agents, fuel and oil additives, hair waving agents, components for flame-proofing or fire-retarding formulations, water-proofing agents, and catalysts for chemical reactions, particularly polymerizations reactions.

---

The compounds may be prepared by reacting in a suitable solvent an alkoxide of the metal and an N,N-substituted hydroxylamine containing the desired alkyl, aryl, and/or alkenyl group.

Following another method, particularly applicable when the valence of the metal is 3 or 4, a halide of the metal is reacted with such an N,N-substituted hydroxylamine in the presence of a suitable solvent.

The invention is illustrated by the following examples which are not to be taken as limitative thereof:

EXAMPLE I

Ti(OPr$^i$)$_4$+HONEt$_2$→Ti(OPr$^i$)$_3$(ONEt$_2$)+HOPr$^i$ 28.4 gm. (0.1 mole) of tetra-isopropoxy titanate, 8.9 gm. (0.1 mole) of N,N-diethylhydroxylamine and 300 ml. of dry benzene were placed in a one-neck 500 ml. distilling flask equipped with Vigreux column and Claisen head.

Upon refluxing, a head temperature of 71.5° C., indicative of a benzene-isopropanol azeotrope, was obtained. This azeotropic distillation was continued until all of the isopropanol was removed. At this point, the head temperature rose to 80.1° C.

Following removal of excess benzene in vacuo, the reaction mixture was distilled to yield tris-isopropoxy(N,N-diethylaminooxy)titanate as determined by NMR, IR CHN, and Ti analyses. The product, a colorless viscous liquid, had a boiling point of 47° C. at 0.005 mm.

EXAMPLE II

Ti(OPr$^i$)$_4$+2HONEt$_2$→Ti(ONEt$_2$)$_2$(OPr$^i$)$_2$+2Pr$^i$OH

The experiment of Example I was repeated using 56.9 gm. (0.2 mole) of tetra-isopropoxy titanate, 35.6 gm. (0.4 mole) of N,N-diethylhydroxylamine and 500 ml. of benzene.

The product, as characterized by NMR, IR, CHN, and Ti analyses, was bis-isopropoxy bis(N,N-diethylaminooxy)titanate. This material was a colorless viscous liquid boiling at 85° C. (0.005 mm.).

EXAMPLE III

Ti(OPr$^i$)$_4$+3HONEt$_2$→Ti(ONEt$_2$)$_3$(OPr$^i$)+3HOPr$^i$

A mixture of 56.9 gm. (0.2 mole) of tetra-isopropoxytitanate and 53.4 gm. (0.6 mole) of N,N-diethylhydroxylamine in 500 ml. of benzene was treated as in the previous examples.

The product, isopropoxy tris(N,N-diethylaminooxy) titanate, was a colorless viscous liquid boiling at 96° C. (0.005 mm.).

EXAMPLE IV

Ti(OPr$^i$)$_4$+4HONEt$_2$→Ti(ONEt$_2$)$_4$+4HOPr$^i$

The experiment was repeated using 28.4 gm. (0.1 mole) of tetra-isopropoxy titanate, 35.6 gm. (0.4 mole) of N,N-diethylhydroxylamine, and 300 ml. benzene.

The product was analyzed by the same procedures as before. It proved to be tetra-N,N-diethylhydroxylamine titanate, a slightly brown solid melting at 76° C.

EXAMPLE V

Ti(OPr$^n$)$_4$+2HONEt$_2$→Ti(ONEt$_2$)$_2$(OPr$^n$)$_2$+2HOPr$^n$

The experiment was repeated using 56.4 gm. (0.2 mole) of tetra-normalpropoxy titanate, 35.6 gm. (0.4 mole) of N,N-diethylhydroxylamine, and 500 ml. benzene.

The product proved to be bis-normalpropoxy bis(N,N-diethylaminooxy)titanate.

EXAMPLE VI

TiCl$_4$+6HONEt$_2$→ClTi(ONEt$_2$)$_3$+3Et$_2$NOH·HCl

Into a 3-neck, 1 liter flask, fitted with a mechanical stirrer, reflux condenser, addition funnel, and nitrogen inlet, was introduced 47.4 gm. (0.25 mole) of titanium tetrachloride in 300 ml. of benzene. To this was added dropwise, 187 gm. (2.1 moles) of N,N-diethylhydroxylamine. The ensuing reaction was exothermic and the reaction mixture became immediately cloudy.

After the addition was complete, the mixture was refluxed for 0.5 hour and allowed to stand overnight. Two layers formed on the standing, the upper layer containing the solvent and reaction products, the lower layer being an oil (N,N-diethylhydroxylamine hydrochloride) which crystallized after separation.

The upper layer was stripped of solvent and excess reactants, and then distilled at 154° C. and 0.05 mm. to obtain a brownish-red solid (M.P. 96°) which proved to be tris(N,N-diethylaminooxy)chlorotitanate.

EXAMPLE VII

TiBr$_4$+6HONϕ$_2$→BrTi(ONϕ$_2$)$_3$+6ϕ$_2$NOH·HBr

When TiBr$_4$ is reacted as described above with N,N-diphenylhydroxylamine, tris(N,N - diphenylaminooxy) bromotitanate is obtained.

EXAMPLE VIII

Ti(OPr$^i$)$_4$+HON(CH=CH$_2$)$_2$→
(OPr$^i$)$_3$Ti[ON(CH=CH$_2$)$_2$]+Pr$^i$OH

When N,N-divinylhydroxylamine is employed according to Example I in place of the N,N-diethylhydroxylamine, the product is tris-isopropoxy(N,N-divinylaminooxy)titanate.

EXAMPLE IX

Zr(OPr$^i$)$_4$+4HONEt$_2$→Zr(ONEt$_2$)$_4$+4Pr$^i$OH 16.4 gm. (0.05 mole) of tetra-isopropoxy zirconium and 20.0 gm. (0.225 mole) of N,N-diethylhydroxylamine were dissolved in 300 ml. of anhydrous benzene, whereafter the solution was heated in a 500 ml. flask, and the resulting azeotrope of isopropanol and benzene removed through a Vigreux column with a fractionating head.

After complete removal of the azeotrope, the excess benzene was stripped in vacuo and the product was distilled.

Distillation was at 130° and 6 microns, yielding tetrakis(N,N-diethylaminooxy)zirconium.

EXAMPLE X

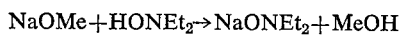
NaOMe+HONEt$_2$→NaONEt$_2$+MeOH

Sodium methoxide, 27 gm. (0.5 mole), and N,N-diethylhydroxylamine, 46 gm. (0.5 mole), were added to 700 ml. of benzene.

After the exothermic reaction had gone to completion, a gelatinous mass remained which dissolved upon addition of 70 ml. of anhydrous methanol. This solution was refluxed for one hour and stripped in vacuo to yield a white powder. Analysis revealed that the product was (N,N-diethylaminooxy)sodium.

The product, which decomposed at about 100°, was soluble in the lower alcohols.

EXAMPLE XI

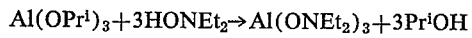
Al(OPr$^i$)$_3$+3HONEt$_2$→Al(ONEt$_2$)$_3$+3Pr$^i$OH

Tris-isopropoxy aluminum, 40.8 gm. (0.2 mole), and N,N-diethylhydroxylamine, 73.2 gm. (0.8 mole), were dissolved in 500 ml. of anhydrous benzene and the solution placed in a one liter boiling flask. Upon heating, the resultant azeotrope was distilled through a Vigreux column fitted with a fractionating head.

With removal of the isopropanol, a viscous liquid resulted. Analyses showed that the same contained tris-(N,N-diethylaminooxy)aluminum.

EXAMPLE XII

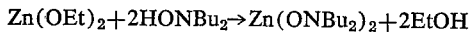
Zn(OEt)$_2$+2HONBu$_2$→Zn(ONBu$_2$)$_2$+2EtOH

When the experiment of Example X is repeated using zinc diethoxide and N,N-dibutylhydroxylamine in proper mole ratio, the product is bis(N,N-dibutylaminooxy)zinc.

EXAMPLE XIII

Any of the experiments supra involving employment of normal or iso-tetrapropoxy titanate when repeated using the corresponding tin compounds, yield the corresponding N,N-dialkyl aminooxy stannates.

The invention claimed is:

1. As an isolated chemical entity, compound conforming to the formula

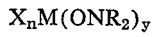
X$_n$M(ONR$_2$)$_y$ in which X represents halogen or alkoxy, M represents a metal from any of Groups I–IV of the Periodic Table, R represents alkyl, aryl, or alkenyl, $y$=1–4, $n$=0 when the valence of M is 1, 0 or 1 when the valence of M is 2, 0–2 when the valence of M is 3, and 0–3 when the valence of M is 4 and $n+y$ equals the valence of M.

2. A compound conforming to claim 1 when R is an alkyl group containing from 1 to 4 carbon atoms and X is alkoxy.

3. A compound conforming to claim 1 when R is an alkyl group containing from 1 to 4 carbon atoms, X is chlorine, and M has a valence of 3 or 4.

4. A compound conforming to claim 2 when R is ethyl and X is iso-propoxy.

5. A compound conforming to claim 2 when R is ethyl and X is n-propoxy.

6. A compound conforming to claim 1 when the metal is titanium.

7. An alkoxy(N,N-dialkylaminooxy)titanate.

8. A bis-alkoxy bis(N,N-dialkylaminooxy)titanate.

9. A mono-alkoxy tris(N,N-dialkylaminooxy)titanate.

10. A tetra-N,N-dialkylhydroxylamine titanate.

11. A compound conforming to claim 10 when the two alkyl groups are ethyl groups.

12. A tetra-kis(N,N-dialkylaminooxy)zirconium.

13. A compound conforming to claim 12 when the two alkyl groups are ethyl groups.

14. A (N,N-dialkylaminooxy)sodium.

15. A compound conforming to claim 14 when the two alkyl groups are ethyl groups.

References Cited

UNITED STATES PATENTS

| | | | |
|---|---|---|---|
| 2,166,076 | 7/1939 | Rosenblatt | 260—429 |
| 2,178,809 | 11/1939 | Rosenblatt | 260—429 |
| 2,272,134 | 2/1942 | Shappiro | 44—9 |
| 2,727,881 | 12/1955 | Caldwell et al. | 260—429.5 XR |
| 3,061,623 | 10/1962 | Mador et al. | 260—429.5 |
| 3,127,431 | 3/1964 | Fink | 260—429.5 XR |
| 3,197,508 | 7/1965 | Hoffmann. | |
| 3,232,990 | 2/1966 | Deger. | |
| 3,338,971 | 8/1967 | Albert et al. | |
| 2,988,534 | 6/1961 | Eckelmann et al. | 260—429.7 XR |
| 3,275,659 | 9/1966 | Weissenberger | 260—429.7 XR |
| 3,296,199 | 1/1967 | Murphy. | |
| 3,318,898 | 5/1967 | Boissieras et al. | |

OTHER REFERENCES

Chemical Abstracts, vol. 30, p. 3796[2] (1936).

TOBIAS E. LEVOW, Primary Examiner

H. M. S. SNEED, Assistant Examiner

U.S. Cl. X.R.

260—429.5, 448, 429.9, 583, 429.7, 435, 429, 431, 430, 438.1, 448.2, 448.8, 462, 999, 46.5; 44—68, 69, 72; 252—8.1, 49.7, 431, 432, 50, 438; 117—137, 138.5